(12) United States Patent
Hoshi (10) Patent No.: US 10,202,928 B2
(45) Date of Patent: Feb. 12, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Kenji Hoshi, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/815,082

(22) Filed: Nov. 16, 2017

(65) Prior Publication Data
US 2018/0195461 A1 Jul. 12, 2018

(30) Foreign Application Priority Data
Jan. 11, 2017 (JP) .................. 2017-002264

(51) Int. Cl.
| F02D 41/30 | (2006.01) |
| F02D 41/40 | (2006.01) |
| F02D 41/06 | (2006.01) |
| F02D 41/00 | (2006.01) |

(52) U.S. Cl.
CPC ........... F02D 41/40 (2013.01); F02D 41/064 (2013.01); F02D 2041/001 (2013.01)

(58) Field of Classification Search
CPC ...... F02D 41/40; F02D 41/064; F02D 41/405; F02D 2041/001; F02D 2041/0015; F02D 13/0257; F02D 2013/0288; F02D 2013/0292; F02D 2013/0296; F02B 23/105; F02B 2023/106; F02B 2023/107; F02B 2023/108; F02P 5/1506; F02P 5/1508

USPC ......... 123/298, 299, 301, 305, 309, 406.53, 123/676, 685, 491, 90.15, 90.16, 90.17
See application file for complete search history.

(56) References Cited

U.S. PATENT DOCUMENTS

| 7,684,925 B2* | 3/2010 | Kuo .................. F02B 17/00 701/113 |
| 7,822,531 B2* | 10/2010 | Alger, II ............. F02B 29/0437 123/299 |
| 8,096,108 B2* | 1/2012 | Najt ..................... F01N 3/2006 60/274 |
| 8,156,920 B2* | 4/2012 | Christ ................. F02D 35/027 123/295 |
| 9,328,688 B2* | 5/2016 | Hitomi ............... F02D 41/3035 |
| 2007/0209630 A1 | 9/2007 | Hiraya et al. |
| 2009/0070007 A1 | 3/2009 | Natsui et al. |
| 2009/0063021 A1 | 5/2009 | Natsui et al. |
| 2015/0101319 A1 | 4/2015 | Takada et al. |

(Continued)

FOREIGN PATENT DOCUMENTS

| JP | 11-280522 A | 10/1999 |
| JP | 2000-282920 A | 10/2000 |
| JP | 2004-340040 A | 12/2004 |

(Continued)

*Primary Examiner* — Hai Huynh
(74) *Attorney, Agent, or Firm* — Sughrue Mion, PLLC (57) ABSTRACT

A lift amount variable mechanism is configured to switch a cam for driving an intake valve (drive cam) between two types of intake cams in lift amount (i.e. a large lift cam and a small lift cam). In a first embodiment of this disclosure, the lift amount variable mechanism is controlled by an ECU so that the small lift cam is selected as the drive cam for control that promotes activation of an exhaust gas cleaning catalyst (catalyst warm-up control).

4 Claims, 9 Drawing Sheets

(56) References Cited

U.S. PATENT DOCUMENTS

2016/0195027 A1    7/2016  Mori et al.
2018/0010567 A1    1/2018  Hirooka

FOREIGN PATENT DOCUMENTS

| | | |
|---|---|---|
| JP | 2006-144609 A | 6/2006 |
| JP | 2007-278272 A | 10/2007 |
| JP | 2008-190511 A | 8/2008 |
| JP | 2008-297965 A | 12/2008 |
| JP | 2009-62946 A | 3/2009 |
| JP | 2009-185688 A | 8/2009 |
| JP | 2011-106377 A | 6/2011 |
| JP | 2011-144782 A | 7/2011 |
| JP | 2015-052290 A | 3/2015 |
| JP | 2015-175283 A | 10/2015 |
| WO | 2013/171830 A1 | 11/2013 |

* cited by examiner

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Applications No. 2017-2264, filed on Jan. 11, 2017. The contents of these applications are incorporated herein by reference in their entirety.

TECHNICAL FIELD

The present disclosure relates to a control device for an internal combustion engine, and more particularly to a control device for controlling an internal combustion engine that includes an injector and a spark plug in a combustion chamber, and also includes a catalyst (exhaust gas cleaning catalyst) that purifies exhaust gas from the combustion chamber.

BACKGROUND

JP2011-106377A discloses an engine configuration with respect to a positional relation between a spark plug and an injector disposed in a combustion chamber, and a control method by using the spark plug and the injector based on the engine configuration. In the engine configuration, a distance from a center position of a discharge gap of the spark plug to a center position of the injection hole which is closest to the spark plug and a distance from the center position of the discharge gap to a center axis of the fuel spray which is injected from the injection hole are set within a specific range, respectively.

The control method based on the engine configuration is to apply a high voltage to the spark plug over a fuel injection period after a lapse of a predetermined time from the start of fuel injection from the injector. The fuel injected from the injector under high pressure forms a low pressure part by taking away the surrounding air (entrainment). According to such control method, the low pressure part is formed to which the discharge spark generated in the discharge gap is attracted. Therefore, the ignitability of the air-fuel mixture formed around the spark plug can be improved.

In addition, JP2011-106377A discloses an activation control of an exhaust gas cleaning catalyst at engine start as an application example of the attraction action described above.

The present inventor is considering another activation control of the exhaust gas cleaning catalyst based on an engine configuration different from the one disclosed in JP 2011-106337 A. The engine configuration under consideration is similar to the engine configuration of JP2011-106337A in the positional relation between the injector and the spark plug. However, the engine configuration under consideration is different from the engine configuration of JP2011-106337A in that a tumble flow is formed from intake air supplied into the combustion chamber. More specifically, the spark plug of the engine configuration under consideration is disposed on a downstream side of the injector when viewing in a tumble flow direction. The tumble flow formed in the combustion chamber swirls from the upper part of the combustion chamber downward at an exhaust port side whereas swirls from a lower part of the combustion chamber upward at an intake port side. A control being considered is assuming such a tumble flow.

The control under consideration is performed, under a condition where the tumble flow formed in the combustion chamber, so that start timing of an ignition period by the spark plug is set to a retard side relative to the compression top dead center. In addition the control under consideration is performed so that an injection period of the injector in an expansion stroke overlaps at least a part of the ignition period. According to such injection in the expansion stroke, similar effect as the attraction action in JP2011-106377A can be obtained. That is, the discharge spark generated in the spark plug can be attracted to the low pressure part caused by the fuel spray which is injected from the injector and heads toward the ignition plug. Therefore, the attracted discharge spark can be brought into contact with the fuel spray caused by the injection in the expansion stroke.

However, the control under consideration based on the tumble flow reveals the following problem. That is, when the tumble flow formed in the combustion chamber is strong, the discharge spark generated by the spark plug tends to flow in the flow direction of the tumble flow and the attraction action due to the injection in the expansion stroke is obstructed. For this reason, when the tumble flow is strong, it becomes difficult to bring the attracted discharge spark into contact with the fuel spray caused by the injection in the expansion stroke. Then, when such a situation occurs frequently in the combustion cycles, combustion fluctuation between cycles increase to affect performance of the engine.

The present disclosure addresses the above described problem, and an object of the present disclosure is, when the activation control of the exhaust gas cleaning catalyst is performed based on the engine configuration in which a part of fuel spray from the injector heads in a direction toward the spark plug that is disposed on the downstream side in the flow direction of the tumble flow, and the electrode portion of the spark plug is disposed in an area that is above a contour surface of the fuel spray that comes closest to the spark plug, to provide a countermeasure against the obstruction in the attraction action by the strong tumble flow.

A first aspect of the present disclosure is a control device for an internal combustion engine which is configured to control an engine, wherein the engine comprising:

an injector which is provided in an upper portion of a combustion chamber and is configured to inject fuel into a cylinder directly;

a spark plug which is configured to ignite an air-fuel mixture inside the cylinder by using a discharge spark generated at an electrode portion, the spark plug is provided at the upper portion of the combustion chamber and on a downstream side relative to the injector in a flow direction of a tumble flow which is formed inside the combustion chamber, the spark plug is provided so that a position of the electrode portion is above a contour surface of a fuel spray injected from the injector toward the spark plug;

a lift amount variable mechanism which is configured to switch a lift amount of an intake cam which is provided in the combustion chamber to drive an intake valve at least between a small lift amount and a large small lift amount; and an exhaust gas cleaning catalyst that is configured to clean exhaust gas from the combustion chamber, wherein, in order to activate the exhaust gas cleaning catalyst, the control device is configured to:

control the spark plug so as to generate a discharge spark at the electrode portion over a predetermined period on a retard side of compression top dead center;

control the injector so as to perform an expansion stroke injection on the retard side of the compression top dead center, an injection period of the expansion stroke injection overlaps with at least a part of the predetermined period; and control the lift amount variable mechanism so that the lift amount of the intake cam is kept in the small lift amount.

A second aspect of the present disclosure is a control device for an internal combustion engine according to the first aspect, wherein, in order to activate the exhaust gas cleaning catalyst, the control device is further configured to:

control the injector so as to perform an intake stroke injection in the same cycle in which the expansion stroke injection is performed; and control the lift amount variable mechanism so that the lift amount of the intake cam is changed when a growth rate of the initial flame is lower than a predetermined determination value, the initial flame is generated by a contact between a part of the fuel spray caused by the intake stroke injection and the discharge spark.

A third aspect of the present disclosure is a control device for an internal combustion engine according to the second aspect, wherein the lift amount variable mechanism is further configured to switch operation angle of the intake cam between a small operation angle and a large operation angle, wherein the engine further comprises a valve timing variable mechanism which is configured to change valve timing of the intake cam, wherein the control device is further configured to control the valve timing variable mechanism, when the growth rate of the initial flame is lower than the predetermined determination value, so that an opening period of the intake valve coincides with before and after the lift amount variable mechanism switches the operation angle and the lift amount of the intake cam and so that a closing period of the intake valve approaches to an intake bottom dead center.

A fourth aspect of the present disclosure is a control device for an internal combustion engine according to the third aspect, wherein the valve timing variable mechanism is further configured to change an overlap period in which an opening period of an exhaust valve provided in the combustion chamber overlaps with the opening period of the intake valve, wherein the control device is further configured to the valve timing variable mechanism so that the overlap period coincides with before and after the lift amount variable mechanism switches the operation angle and the lift amount of the intake cam.

According to the first aspect, it is possible to select the small lift amount as the lift amount of the intake cam for the activation control of the exhaust purification catalyst. Therefore, the tumble flow formed in the combustion chamber can be weakened as compared with a case where the large lift amount is selected as the lift amount of the intake cam. Therefore, it is possible to prevent the attraction due to the expansion stroke injection from being obstructed by the tumble flow.

According to the second aspect, the tumble flow can be weakened when the growth rate of the initial flame is lower than the predetermined determination value.

According to the third aspect, the opening period of the intake valve can be matched with each other before and after the lift amount variable mechanism switches the operation angle and the lift amount of the intake cam, and the closing timing of the intake valve can be brought closer to the intake bottom dead center. Therefore, it is possible to increase the actual compression ratio after the switches in the operation angle and the lift amount of the intake cam, and to weaken the tumble flow further.

According to the fourth aspect, the overlap period between the exhaust valve and the intake valve can be matched with each other before and after the lift amount variable mechanism switches the operation angle and the lift amount of the intake cam. Therefore, deterioration of emission before and after the switches in the operation angle and the lift amount of the intake cam can be suppressed.

DESCRIPTION OF EMBODIMENTS

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

First, a first embodiment of the present disclosure will be described referring to FIG. 1 to FIG. 12.

[Description of System Configuration]

Figure 1:
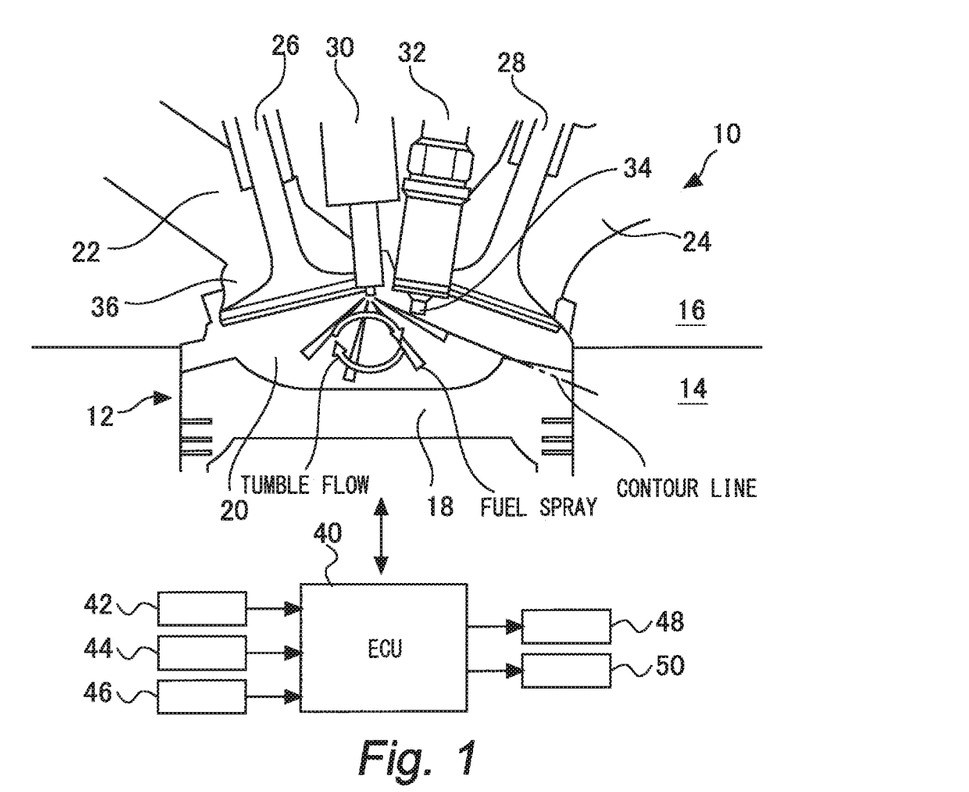
FIG. 1 is a view for describing a system configuration according to a first embodiment of the present disclosure.

FIG. 1 is a view for describing the system configuration according to the first embodiment. As illustrated in FIG. 1, a system according to the present embodiment includes an internal combustion engine 10 that is mounted in a vehicle. The internal combustion engine 10 is a four-stroke, one-cycle engine that has a plurality of cylinders. However, only one cylinder 12 among the plurality of cylinders is depicted in FIG. 1. The internal combustion engine 10 has a cylinder block 14 in which the cylinder 12 is formed, and a cylinder head 16 that is disposed above the cylinder block 14. In the cylinder 12, a piston 18 is arranged that reciprocates in the axial direction thereof (the vertical direction in the first embodiment). A combustion chamber 20 of the internal combustion engine 10 is defined by at least a wall surface of the cylinder block 14, a bottom face of the cylinder head 16 and a top face of the piston 18.

In the cylinder head 16, two intake ports 22 and two exhaust ports 24 which communicate with the combustion chamber 20 are formed. An intake valve 26 is provided at an opening portion that communicates with the combustion chamber 20 of each intake port 22. An exhaust valve 28 is provided at an opening portion that communicates with the combustion chamber 20 of each exhaust port 24. Further, an injector 30 is provided in the cylinder head 16 so that a tip thereof faces the combustion chamber 20 from approximately the center of an upper portion of the combustion chamber 20. The injector 30 is connected to a fuel supply system that is constituted by a fuel tank, a common rail, a supply pump and the like. A plurality of injection holes are formed in a radial shape in the tip of the injector 30. When the injector 30 is opened, fuel is injected in a high pressure state from the injection holes.

In the cylinder head 16, a spark plug 32 is provided at an upper portion of the combustion chamber 20 at a position that is further to the side of the exhaust valve 28 in comparison to the location at which the injector 30 is provided. The spark plug 32 includes, at the tip thereof, an electrode portion 34 that is constituted by a center electrode and a ground electrode. The electrode portion 34 is arranged so as to project into an area that is above a contour surface of a fuel spray (hereinafter also referred to as "spray contour surface" of the injector 30 (that is, into an area from the spray contour surface to the bottom face of the cylinder head 16). More specifically, the electrode portion 34 is arranged so as to project into an area that is above a contour surface of a fuel spray that comes closest to the spark plug 32 among fuel sprays ejected in a radial shape from the injection holes of the injector 30. Note that, a contour line drawn in FIG. 1 represents a contour surface of the fuel spray that comes closest to the spark plug 32 among the fuel sprays from the injector 30.

The intake port 22 extends approximately straight in the direction of the combustion chamber 20 from an inlet on the intake passage side, and the channel cross-sectional area is narrowed down at a throat 36 that is a connecting portion with the combustion chamber 20. This shape of the intake port 22 generates a tumble flow in intake air that is supplied from the intake port 22 to the combustion chamber 20. The tumble flow swirls inside the combustion chamber 20. More specifically, at the upper portion of the combustion chamber 20 the tumble flow moves from the intake port 22 side toward the exhaust port 24 side, and on the exhaust port 24 side the tumble flow moves from the upper portion of the combustion chamber 20 toward the lower portion thereof. Further, at the lower portion of the combustion chamber 20 the tumble flow moves from the exhaust port 24 side to the intake port 22 side, and on the intake port 22 side the tumble flow moves from the lower portion of the combustion chamber 20 toward the upper portion thereof. A depression for holding the tumble flow is formed in the upper face of the piston 18 that forms the bottom portion of the combustion chamber 20.

Tumble ratio of the tumble flow (angular velocity of the tumble flow/engine speed) TTR is set to a high value of 3.5 or more. The reason for this is that the engine configuration according to the first embodiment aims at a high compression ratio and massive introduction of EGR gas in an operation region with high use frequency. As the compression ratio increases, turbulence in the cylinder decreases. Therefore, when a large amount of EGR gas is introduced into the cylinder with low turbulence, the combustion resistance in the above operation region decreases. For this reason, the tumble ratio TTR is set to the high value.

Further, as illustrated in FIG. 1, the system according to the first embodiment includes an ECU (electronic control unit) 40 as control means. The ECU 40 includes a RAM (random access memory), a ROM (read only memory), a CPU (central processing unit) and the like. The ECU 40 performs processing to take in signals of various sensors that are mounted in the vehicle. The various sensors include at least an in-cylinder pressure sensor 42 that is provided at the upper portion of the combustion chamber 20, a crank angle sensor 44 that detects a rotation angle of a crankshaft that is connected to the piston 18, and a temperature sensor 46 that detects a temperature of cooling water of the internal combustion engine 10. The ECU 40 processes the signals of the respective sensors that are taken in, and actuates various actuators in accordance with a predetermined control program.

The actuators that are operated by the ECU 40 include two types of variable valve mechanisms in addition to the injector 30 and the spark plug 32. Specifically, these variable valve mechanisms are a lift amount variable mechanism 48 and a valve timing variable mechanism 50. The lift amount variable mechanism 48 is configured to switch a cam for driving the intake valve 26 (hereinafter also referred to as "drive cam") between two types of intake cams in lift amount (i.e. a large lift cam and a small lift cam). The valve timing variable mechanism 50 is configured to change a lift center of the intake valve 26 in a continuous manner. When the lift center is changed by the valve timing variable mechanism 50, opening timing and closing timing of the intake valve 26 are changed continuously.

[Startup Control by ECU 40]

In the first embodiment, the ECU 40 performs control that promotes activation of an exhaust gas cleaning catalyst (hereinafter also referred to as "catalyst warm-up control") immediately after a cold startup of the internal combustion engine 10. The exhaust gas cleaning catalyst is a catalyst that is provided in an exhaust passage of the internal combustion engine 10. A three-way catalyst that purifies nitrogen oxides (NOx), hydrocarbon (HC) and carbon monoxide (CO) contained in exhaust gas when the atmosphere of the catalyst that is in an activated state is in the vicinity of stoichiometry may be mentioned as one example of the exhaust gas cleaning catalyst.

Figure 2:
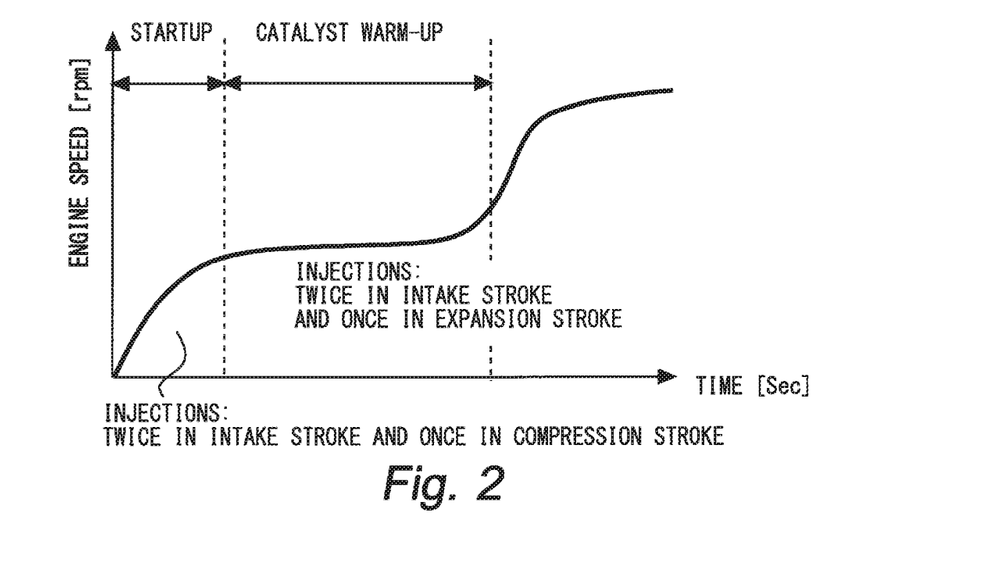
FIG. 2 is a view for illustrating an example of a fuel injection pattern immediately after startup of an internal combustion engine 10.

The catalyst warm-up control will now be described referring to FIGS. 2 to 4. FIG. 2 illustrates an example of a fuel injection pattern immediately after a cold startup of the internal combustion engine 10. As illustrated in FIG. 2, immediately after startup, first, a fuel injection pattern is adopted in which twice injections in an intake stroke (hereinafter also referred to as "intake stroke injection") and a single injection in a compression stroke (hereinafter also referred to as "compression stroke injection") are combined. Thereafter, accompanying an increase in the engine speed, the compression stroke injection is switched to a single injection in an expansion stroke (hereinafter also referred to as "expansion stroke injection") so as to start the catalyst warm-up control. That is, in the catalyst warm-up control, a fuel injection pattern that combines the intake stroke injection and the expansion stroke injection is adopted.

Figure 3:
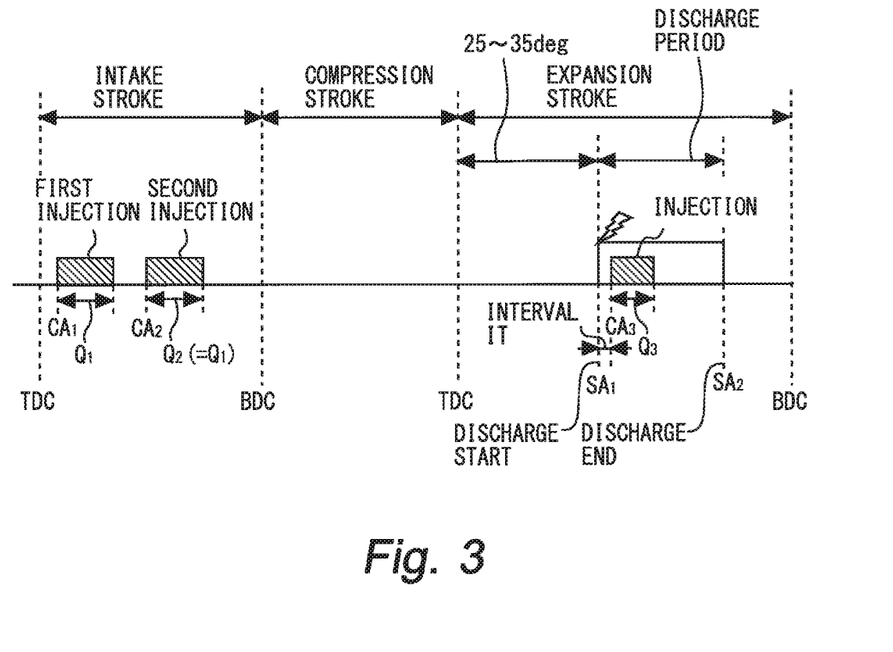
FIG. 3 is a view for illustrating injection start timings, injection periods and a discharge period at an electrode portion 34 during catalyst warm-up control.
Figure 4:
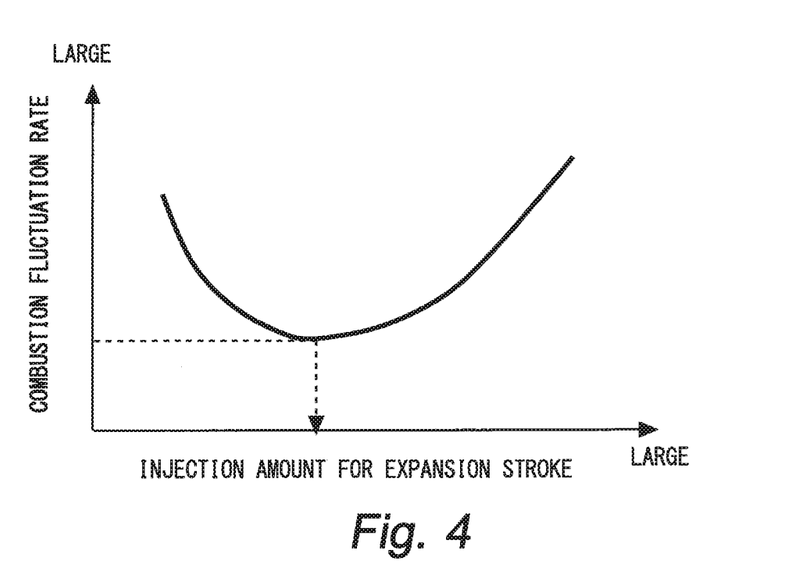
FIG. 4 is a view for illustrating a relation between a combustion fluctuation rate and a fuel injection amount for an expansion stroke injection.

FIG. 3 illustrates injection start timings, injection periods, and a discharge period at the electrode portion 34 during catalyst warm-up control. As illustrated in FIG. 3, a first intake stroke injection is started at a crank angle $CA_1$ (as one example, in the vicinity of BTDC 300°), and a second intake stroke injection is started at a crank angle $CA_2$ (as one example, in the vicinity of BTDC 260°). The second intake stroke injection is performed for the purpose of increasing the homogeneity of the air-fuel mixture in the combustion chamber 20. A first injection period $Q_1$ and a second injection period $Q_2$ are set to the same value. However, first injection period $Q_1$ may be different from the second injection period $Q_2$.

As illustrated in FIG. 3, during the catalyst warm-up control, a discharge period (predetermined period) at the electrode portion 34 is set on the retard side of compression top dead center. The reason for setting the discharge period on the retard side of compression top dead center is to raise the exhaust gas temperature, and the expansion stroke injection is performed during this discharge period. More specifically, the expansion stroke injection is started at a crank angle $CA_3$ that is on the retard side relative to a start timing $SA_1$ (as one example, the vicinity of ATDC 25° to 35°) of the discharge at the electrode portion 34, and an injection period $Q_3$ ends on the advance side relative to an end timing $SA_2$ of the discharge at the electrode portion 34.

Although FIG. 3 illustrates an interval IT between the start timing $SA_1$ and the crank angle $CA_3$, the start timing $SA_1$ and the crank angle $CA_3$ may match (That is, the interval IT may be zero). Further, the end timing $SA_2$ of the discharge at the electrode portion 34 and a completion timing of the injection period $Q_3$ may match. Further, the injection period $Q_3$ may straddle the start timing $SA_1$ or the end timing $SA_2$. That is, the expansion stroke injection may be performed so that the injection period of the expansion stroke injection overlaps with at least a part of the discharge period. The reason why the expansion stroke injection is performed in such manner is to make an attraction action described later.

The injection period $Q_3$ shown in FIG. 3 is set based on a relation between a fuel injection amount for the expansion stroke injection and a combustion fluctuation rate. The combustion fluctuation rate is obtained under equivalent operating conditions as the operating conditions during the catalyst warm-up control. An example of this relation is illustrated in FIG. 4. As illustrated in FIG. 4, a combustion fluctuation rate obtained under equivalent operating conditions as the operating conditions during the catalyst warm-up control has a downwardly convex shape within a specific fuel injection amount range. The injection period $Q_3$ is set as an injection period corresponding to a fuel injection amount when the combustion fluctuation rate becomes smallest (as one example, from 3 to 5 $mm^3$/st).

[Catalyst Warm-Up Control Utilizing Attraction Action and Issue Relating Thereto]

Figure 5:
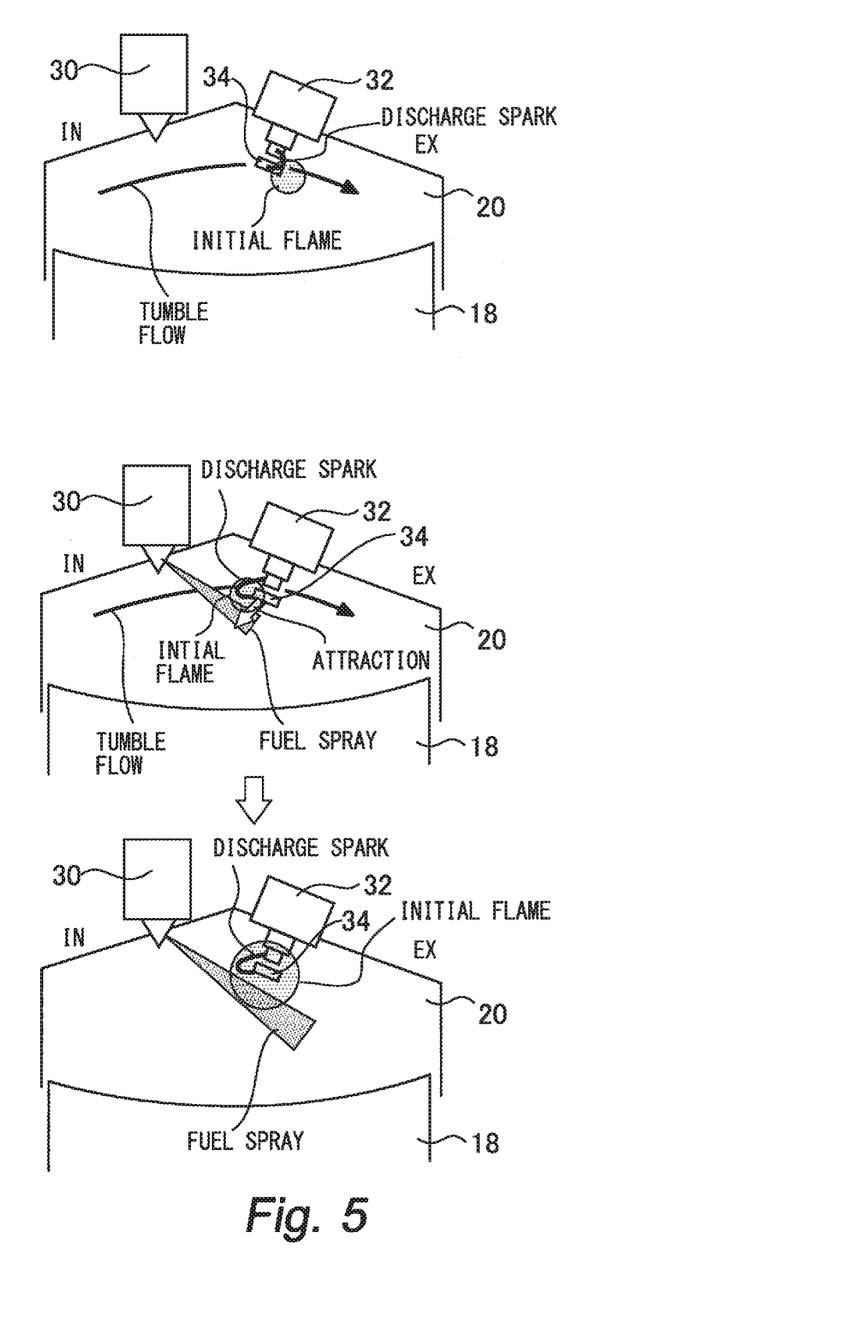
FIG. 5 is a view for describing an attraction action caused by the expansion stroke injection.

FIG. 5 is a view for describing an attraction action with respect to a discharge spark that is caused by an expansion stroke injection. Two discharge spark states during the discharge period at the electrode portion 34 are illustrated in the upper diagram and the middle diagram in FIG. 5. The upper diagram in FIG. 5 corresponds to a case where an expansion stroke injection is not performed, and the middle diagram and lower diagram in FIG. 5 correspond to a case where an expansion stroke injection is performed. Note that, for convenience of description, among the fuel sprays produced by the expansion stroke injection, only a fuel spray that is closest to the spark plug 32 is illustrated in FIG. 5. When an expansion stroke injection is not performed, a discharge spark that arises at the electrode portion 34 and an initial flame that generates from the discharge spark extend in the flow direction of the tumble flow (upper diagram in FIG. 5). On the other hand, when an expansion stroke injection is performed, since a low pressure area is formed around the fuel spray (entrainment), the discharge spark and the initial frame are attracted in the opposite direction to the flow direction of the tumble flow (middle diagram in FIG. 5). Then, the discharge spark contacts with an air-fuel mixture including the fuel spray by the expansion stroke injection whereas the initial frame engulfs the fuel spray by the expansion stroke injection. Therefore, the initial frame grows at once (lower diagram in FIG. 5).

Figure 6:
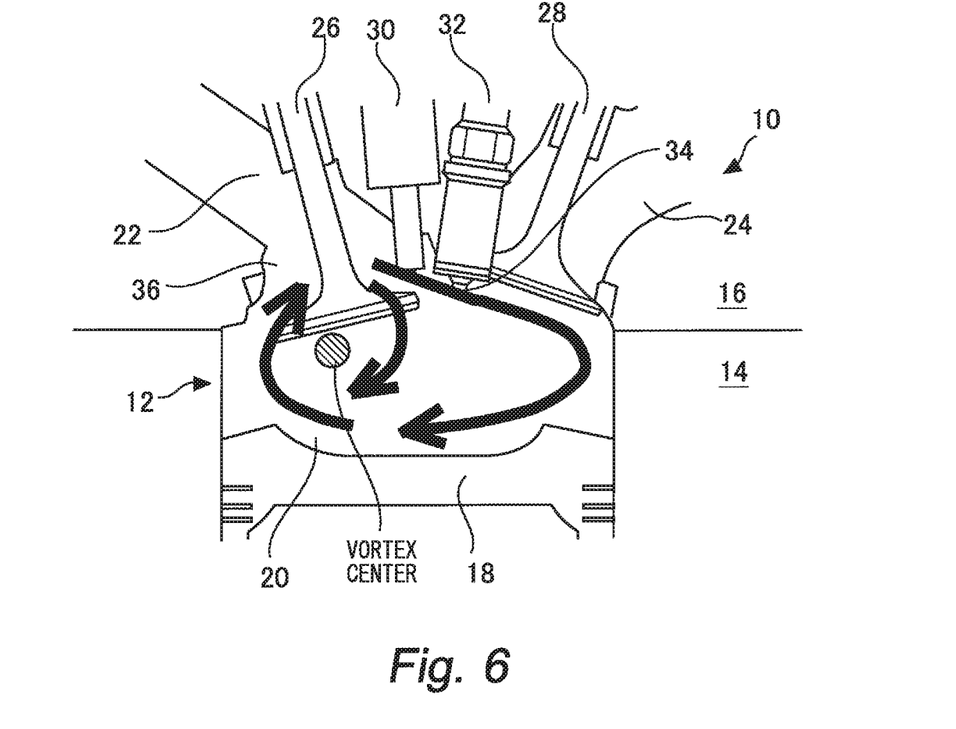
FIG. 6 is a view for describing an issue when a strong tumble is formed in a combustion chamber 20.
Figure 7:
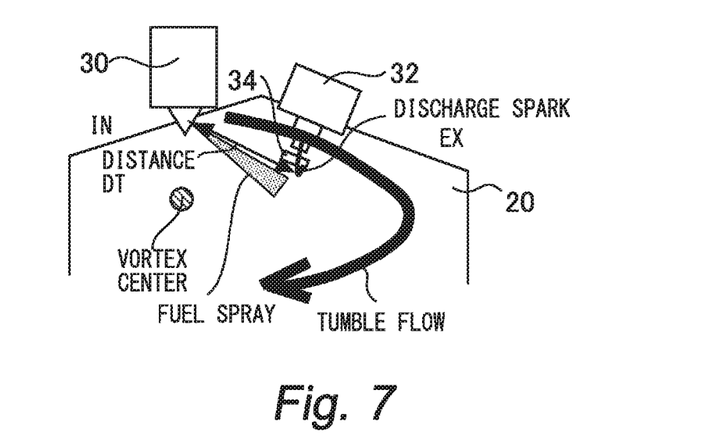
FIG. 7 is a view for describing the issue when the strong tumble is formed in the combustion chamber 20.

However, in the first embodiment in which the tumble ratio is set to the high value, when the large lift cam is selected as the drive cam for the catalyst warm-up control, the attraction of the discharge spark and the initial flame is strongly affected by the tumble flow. FIGS. 6 and 7 are diagrams for describing a problem when a strong tumble flow is formed in the combustion chamber 20. As shown in FIGS. 6 and 7, when a strong tumble flow is formed in the combustion chamber 20, the attracting action of the discharge spark of the discharge spark at the electrode section 34 is obstructed and a distance between the injector 30 and the discharge spark (hereinafter, also referred to as "distance DT") is enlarged. Then, the contact between the discharge spark and the fuel spray by the expansion stroke injection is insufficient, and the growth of the initial frame is suppressed. As a result, the growth speed, that is, the initial combustion speed decreases. When such a situation occurs frequently in the combustion cycle during the catalyst warm-up control, combustion fluctuation between cycles increases to affect performance of the internal combustion engine 10.

[Characteristics of Catalyst Warm-Up Control in First Embodiment]

Therefore, in the first embodiment, the lift amount variable mechanism 48 is controlled so that the small lift cam is selected as the drive cam for the catalyst warm-up control. For example, when the large lift cam is selected as the drive cam for the cold startup of the internal combustion engine 10, the lift amount variable mechanism 48 is controlled so as to switch the drive cam from the large lift cam to the small lift cam simultaneously with the start of the catalyst warm-up control. Note that when the drive cam for the catalyst warm-up control is switched from the large lift cam to the small lift cam, the valve timing variable mechanism 50 is controlled, in addition to the lift amount variable mechanism 48, so that the lift center of the intake valve 26 is maintained before and after the cam switch.

Figure 8:
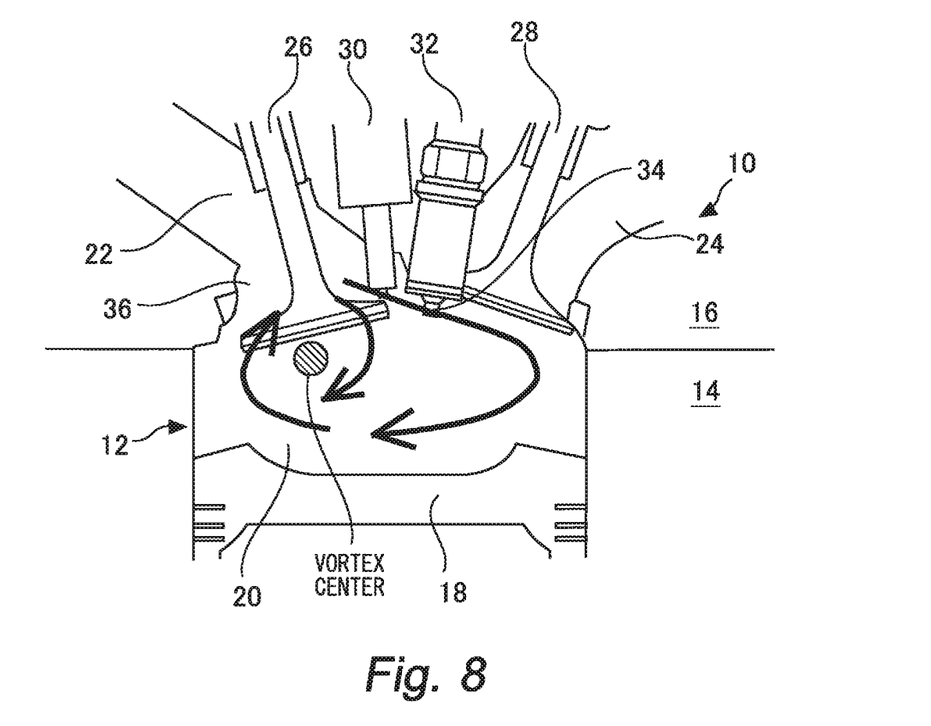
FIG. 8 is a view for describing an overview of the catalyst warm-up control according to the first embodiment.
Figure 9:
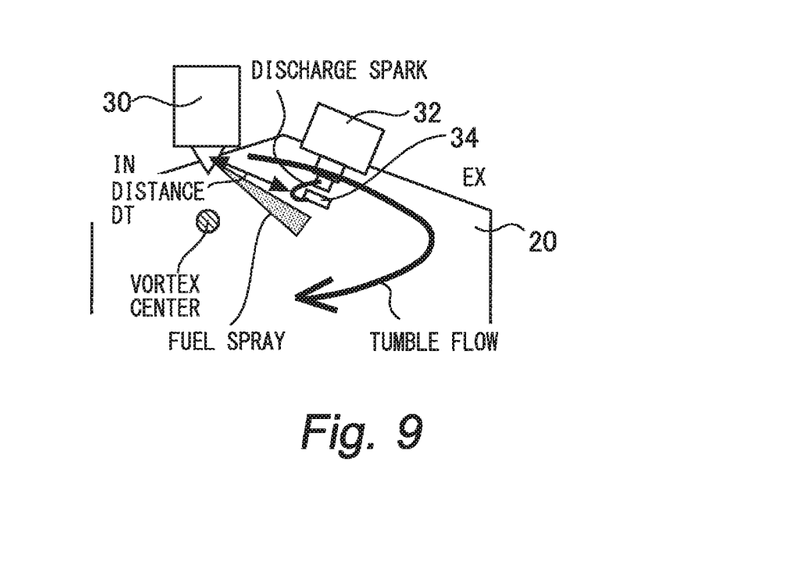
FIG. 9 is a view for describing the overview of the catalyst warm-up control according to the first embodiment.

FIGS. 8 and 9 are views for describing an overview of the catalyst warm-up control according to the first embodiment. As can be seen from comparison with FIGS. 6 and 7, the width of the arrows illustrated in FIGS. 8 and 9 is thinner than that of the tumble flow illustrated in FIGS. 6 and 7. This indicates that the flow speed of the tumble flow between the intake valve 26 and the exhaust valve 28 decreases by selecting the small lift cam as the drive cam for the catalyst warm-up control. As the flow speed of the tumble flow between these valves 26 and 28 decreases, that of the tumble flow in the combustion chamber 20 decrease. Then, the vortex center of the tumble flow approaches to the cylinder head 16. Therefore, it is possible to reduce the influence of the tumble flow described in FIG. 7 and to avoid the situation where the distance DT is enlarged.

Figure 10:
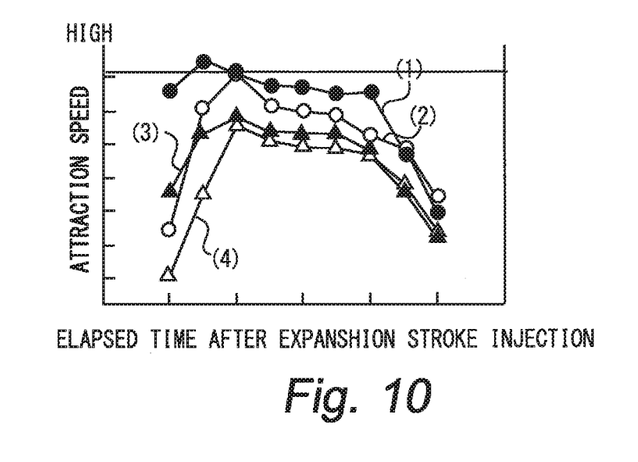
FIG. 10 is a view for illustrating a relation between an elapsed time after the expansion stroke injection and attraction speed of a fuel spray.
Figure 11:
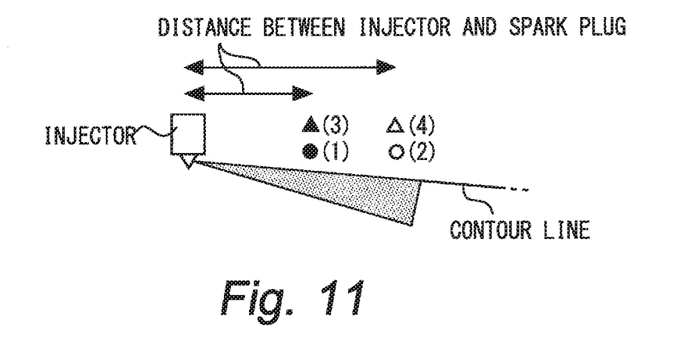
FIG. 11 is a view for illustrating positional relation between an injector and a spark plug, each of which corresponds to the results shown in FIG. 10.

FIG. 10 is a view for illustrating a relation between an elapsed time after the expansion stroke injection and attraction speed of a fuel spray. The results (1) to (4) of the attraction speeds illustrated in FIG. 10 represent changes in attraction speed when the spark plug locates at positions (1) to (4) illustrated in FIG. 11. The positions (1) and (2) illustrated in FIG. 11 differ in the distance between the injector and the spark plug. A positional relationship between positions (3) and (4) is the same as the positional relationship between positions (1) and (2). As can be seen by comparing the results of (1) and (2) or the results of (3) and (4), the closer the distance between the injector and the spark plug is, the attraction speed tends to be higher. This is presumably because the pressure of the low pressure part formed around the fuel spray decreases as the spark plug approaches to the injector.

Figure 12:
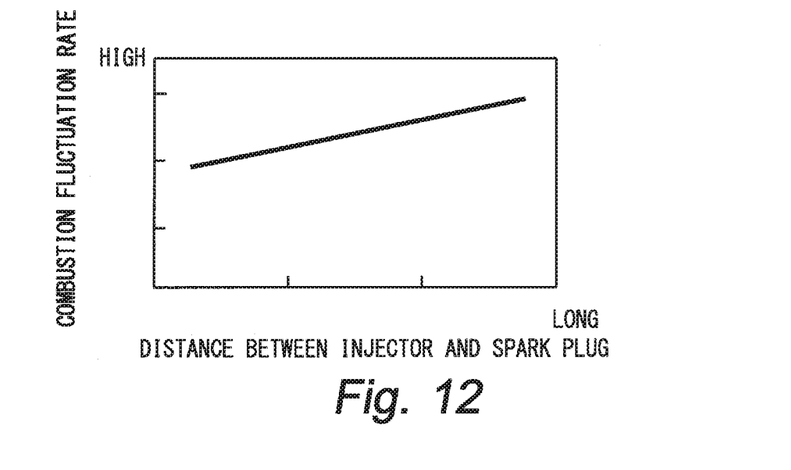
FIG. 12 is a view for illustrating a relation between a combustion fluctuation rate among cycles and distance from the injector to the spark plug.

FIG. 12 is a view for illustrating a relation between a combustion fluctuation rate between cycles and distance from the injector to the spark plug. As shown in FIG. 12, the closer the distance between the spark plug and the injector is, the smaller the combustion fluctuation rate between cycles becomes.

As can be understood from the description of FIG. 10, the closer the distance between the spark plug and the injector is, the higher the attraction speed becomes. And as can be understood from the description of FIG. 12, the closer the distance between the spark plug and the injector is, the smaller the combustion fluctuation rate between cycles becomes. Then, when the tumble flow is formed in the combustion chamber, the distance between the spark plug and the injector can be replaced with the distance DT. Therefore, according to the catalyst warm-up control of the first embodiment, since it is possible to avoid the situation where the distance DT is enlarged, it is possible to suppress a decrease in the attraction speed and to suppress an increase in combustion fluctuation between cycles.

Second Embodiment

Figure 13:
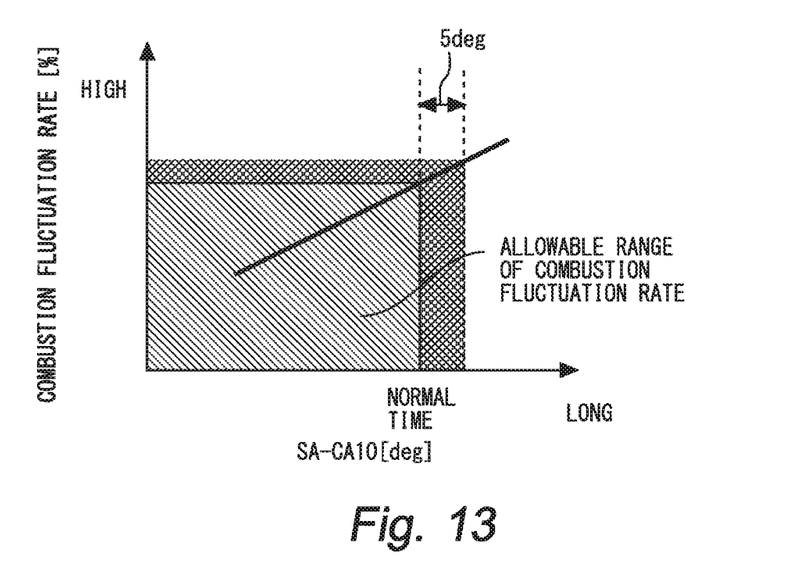
FIG. 13 is a view illustrating a relation between the combustion fluctuation rate and SA-CA10.

Next, a second embodiment of the present disclosure will be described referring to FIG. 13 and FIG. 24.
[Characteristics of Catalyst Warm-Up Control in Second Embodiment]

In the above first embodiment, the lift amount variable mechanism 48 is controlled so that the small lift cam is selected as the drive cam for the catalyst warm-up control. In the second embodiment, a determination with respect to the initial combustion speed is performed before selecting the small lift cam as the drive cam for the catalyst warm-up control. Then, when it is determined that the initial combustion speed is slow, the lift amount variable mechanism 48 is controlled so that the small lift cam is selected as the drive cam.

Whether the initial combustion speed is slow or not is determined based on a SA-CA 10. The SA-CA 10 is defined as a crank angle period from a starting point of the initial combustion (crank angle CA0) which starts behind a starting point of an ignition timing (that is, the discharge start timing at the electrode portion 34) to a combustion point in which mass fraction burned (MFB) reaches 10% (crank angle CA10). Note that, the MFB is calculated based on a result of analyzing in-cylinder pressure data that is obtained utilizing the in-cylinder pressure sensor 42 and the crank angle sensor 44, and SA-CA10 is calculated based on the calculated MFB. A method for calculating MFB based on the analysis result and a method for calculating the SA-CA10 based on the calculated MFB are described in detail in, for example, JP 2015-094339 A and JP 2015-098799 A, and hence a description thereof is omitted from the present description.

As understood from the definition of the SA-CA 10, the fact that a value of the SA-CA 10 is small means that a period from MFB 0% to 10% is short. Conversely, if the value of the SA-CA 10 is large, it means that the period from MFB 0% to 10% is long. FIG. 13 is a view illustrating a relation between the combustion fluctuation rate and SA-CA10. As shown in FIG. 13, when the SA-CA 10 becomes longer, the combustion fluctuation rate becomes larger and exceeds an allowable range.

In the catalyst warm-up control of the second embodiment, it is determined that the initial combustion speed is slow when the SA-CA10 that is actually calculated by the ECU 40 (hereunder, also referred to as "actual SA-CA10") is longer than the SA-CA10 at a normal time by a predetermined crank angle period (as one example, 5°) or more. Note that, the SA-CA10 at a normal time and the SA-CA10 that is longer than the SA-CA10 at the normal time by the predetermined crank angle period are set in advance by adaptation.

Specific Processing in Second Embodiment

Figure 14:
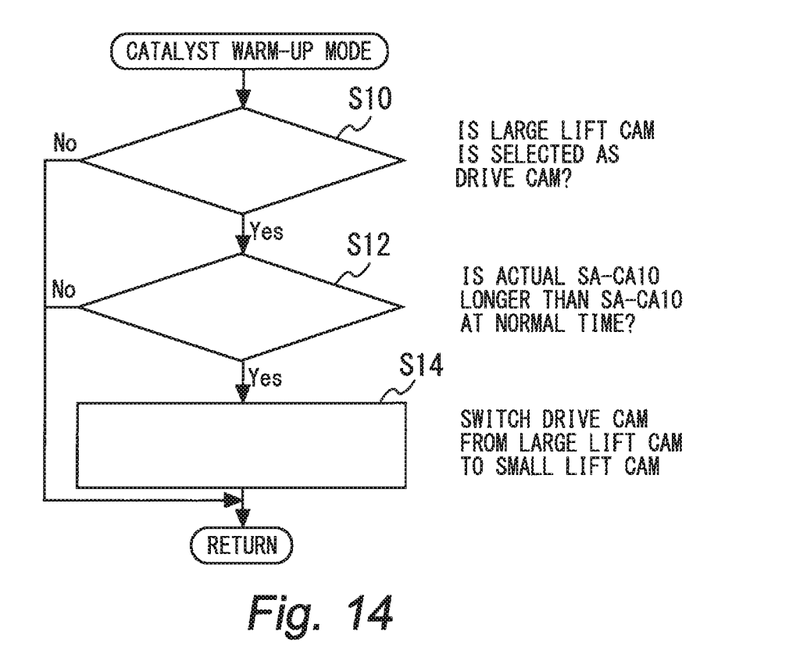
FIG. 14 is a flowchart for illustrating an example of processing that an ECU 40 executes in a second embodiment of the present disclosure.

FIG. 14 is a flowchart for illustrating an example of processing that the ECU 40 executes in the second embodiment. Note that the routine shown in FIG. 14 is repeatedly executed during a period in which an operation mode that executes the catalyst warm-up control (hereinafter also referred to as "catalyst warm-up mode") is selected.

In the routine illustrated in FIG. 14, first, it is determined whether or not the large lift cam is selected as the drive cam for the catalyst warm-up control (step S10). When the determination result of the step S10 is negative (when the result is "No"), it is determined that the small lift cam is selected as the drive cam. Therefore, in this case, the ECU 40 exits the present routine.

On the other hand, when the determination result of the step S10 is positive (when the result is "Yes"), it is determined whether or not the actual SA-CA10 is longer than the SA-CA10 at the normal time by the predetermined crank angle period or more (step S12). In the step S12, the actual SA-CA10 that is calculated separately in the ECU 40 is acquired, and the calculated actual SA-CA10 is compared with the SA-CA10 at the normal time. When the determination result of the step S12 is negative (when the result is "No"), it is determined that there is no particular problem in the initial combustion speed although the large lift cam is selected as the drive cam. Therefore, in this case, the ECU 40 exits the present routine.

On the other hand, when the determination result of the step S12 is positive (when the result is "Yes"), it is determined that the initial combustion speed is slow and the distance DT is enlarged because of the initial combustion speed. Therefore, in this case, the ECU 40 switches the drive cam from the large lift cam to the small lift cam (step S14).

As described above, according to the routine illustrated in FIG. 14, when the large lift cam is selected as the drive cam, it is possible to determine with respect to the initial combustion speed on the basis for the SA-CA 10. Further, according to the routine illustrated in FIG. 14, when it is determined that the initial combustion speed is slow, it is possible to switch the drive cam from the large lift cam to the small lift cam. Therefore, even when the initial combustion speed is slow due to the large lift cam as the drive cam, it is possible to suppress the increase in combustion fluctuation between cycles.

Third Embodiment

Next, a third embodiment of the present disclosure will be described referring to FIG. 15 to FIG. 18.
[Description of Engine Configuration]
The engine described in the first or the second embodiment comprises the large lift cam and the small lift cam and the lift amount variable mechanism 48 by which the drive cam is switched between these intake cams. In spite of these intake cams, an engine of the third embodiment comprises two types of intake cams in lift amount and operation angle (i.e. a large lift/large operation angle cam and a small lift/small operation angle cam). Further, in spite of the lift amount variable mechanism 48, the engine of the third embodiment comprises an operation angle and lift amount variable mechanism. The operation angle and lift amount variable mechanism is configured to switch the drive cam between the large lift/large operation angle cam and the small lift/small operation angle cam. Hereinafter, for the purpose of description, the large lift/large operation angle cam is simply referred to as "large cam" and the small lift/small operation angle cam is simply referred to as "small cam".
[Characteristics of Catalyst Warm-Up Control in Third Embodiment]
In the catalyst warm-up control of the second embodiment, when the large lift cam is selected as the drive cam and it is determined that the initial combustion speed is slow, the drive cam is switched from the large lift cam to the small lift cam. Essentially the same as the catalyst warm-up control of the second embodiment, in the catalyst warm-up control of the third embodiment, the drive cam is switched from the large cam to the small cam when these conditions are right. The switching of the drive cam is realized by controlling the operation angle and lift amount variable mechanism.

Figure 15:
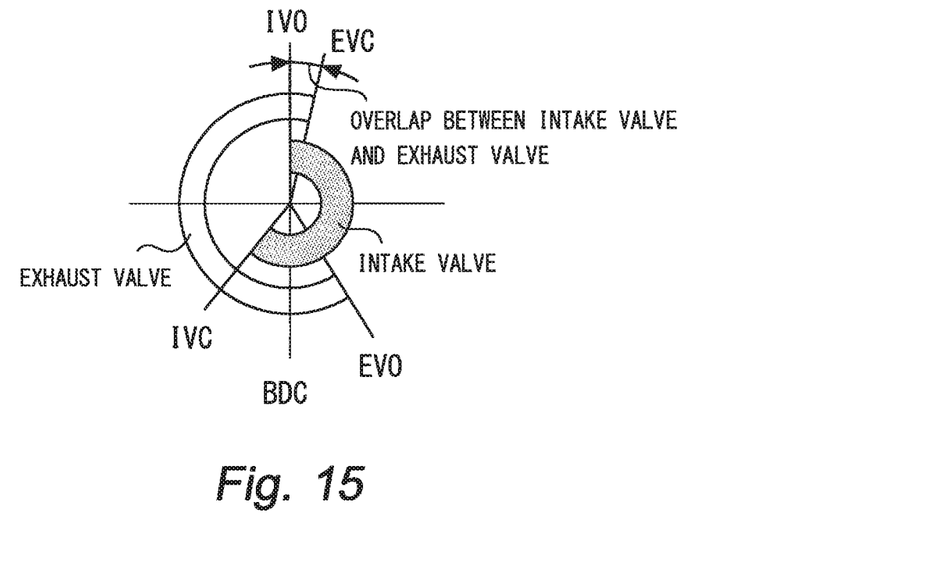
FIG. 15 is a view for describing an example of an overlap period before switching of a drive cam.
Figure 16:
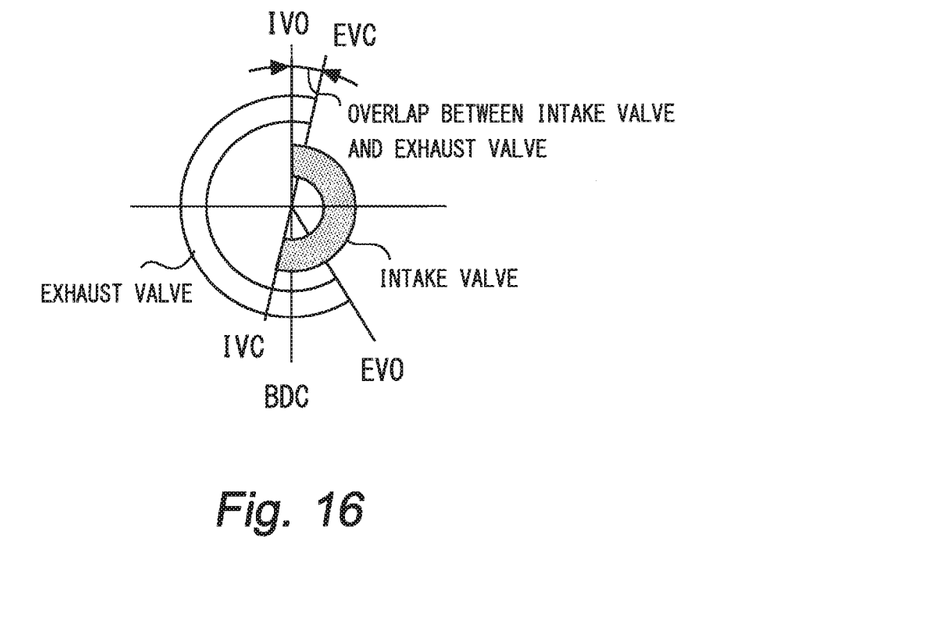
FIG. 16 is a view for describing an example of the overlap period after switching of the drive cam.

In the catalyst warm-up control of the third embodiment, further, the operation angle and lift amount variable mechanism is controlled so that an overlap period in which an opening period of the intake valve overlaps with that of the exhaust cam coincides with before and after the switching of the drive cam. FIG. 15 is a view for describing an example of the overlap period before switching of the drive cam. FIG. 16 is a view for describing an example of the overlap period after switching of the drive cam. As can be seen from comparison with FIGS. 15 and 16, the opening timing of the intake valve IVO is aligned before and after switching of the drive cam while the closing timing of the exhaust valve IVC is advanced after switching of the drive cam. In this manner, deterioration of emission in association with the switching of the drive cam can be suppressed.

Figure 17:
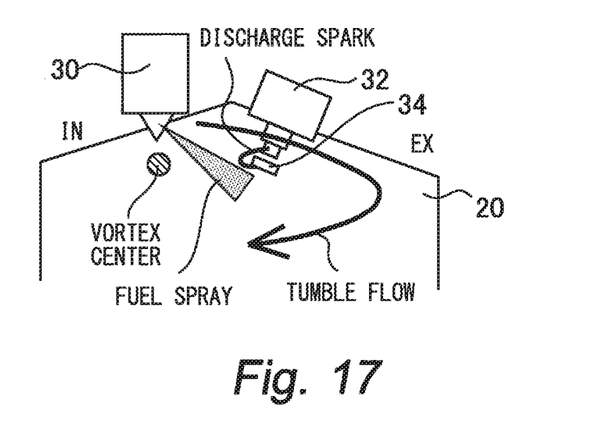
FIG. 17 is a view for describing a state in a cylinder when an intake valve is closed earlier.

Further, by advancing the closing timing of the intake valve IVC, a state in the cylinder can be improved. FIG. 17 is a view for describing a state in a cylinder when an intake valve is closed earlier. When the drive cam is switched from the large cam to the small cam, the flow speed of the tumble flow between the intake valve 26 and the exhaust valve 28 decreases. Up to this point is the same as described in FIG. 9. In the third embodiment, however, since the close timing of the intake valve is advanced, the flow speed of the tumble flow between these valves 26 and 28 becomes more slowly. Then, the tumble flow in the combustion chamber 20 becomes more slowly and the vortex center of the tumble flow approaches closer to the cylinder head 16 than that illustrated in FIG. 9.

In the catalyst warm-up control of the third embodiment, further, the close timing of the intake valve is advanced to approach to bottom dead center side. When the close timing of the intake valve approaches to the bottom dead center side, an actual compression ratio rises. When the actual compression ratio rises, the in-cylinder pressure increases. Then, it is difficult for the fuel spray caused by the expansion stroke injection to proceed in the injection direction and a cone angle is enlarged. Then, a distance between an outer surface of the fuel spray caused by the expansion stroke injection and the discharge spark is shorten. Referring again to FIGS. 10 and 11, the positions (1) and (3) illustrated in FIG. 11 differ in the distance between the outer surface of the fuel spray and the discharge spark. A positional relationship between positions (2) and (4) is the same as the positional relationship between positions (1) and (3). As can be seen by comparing the results of (1) and (3) or the results of (2) and (4), the closer the distance between the outer surface of the fuel spray and the discharge spark is, the attraction speed tends to be higher.

As can be understood from the description of FIG. 10, the closer the distance between the outer surface of the fuel spray and the discharge spark is, the higher the attraction speed becomes. And, according to the catalyst warm-up control of the third embodiment, the distance between the outer surface of the fuel spray and the discharge spark is shorten by the enlargement of the cone angle. Therefore, it is possible to further suppress the decrease in the attraction speed in comparison to the catalyst warm-up control of the second embodiment.

Specific Processing in Third Embodiment

Figure 18:
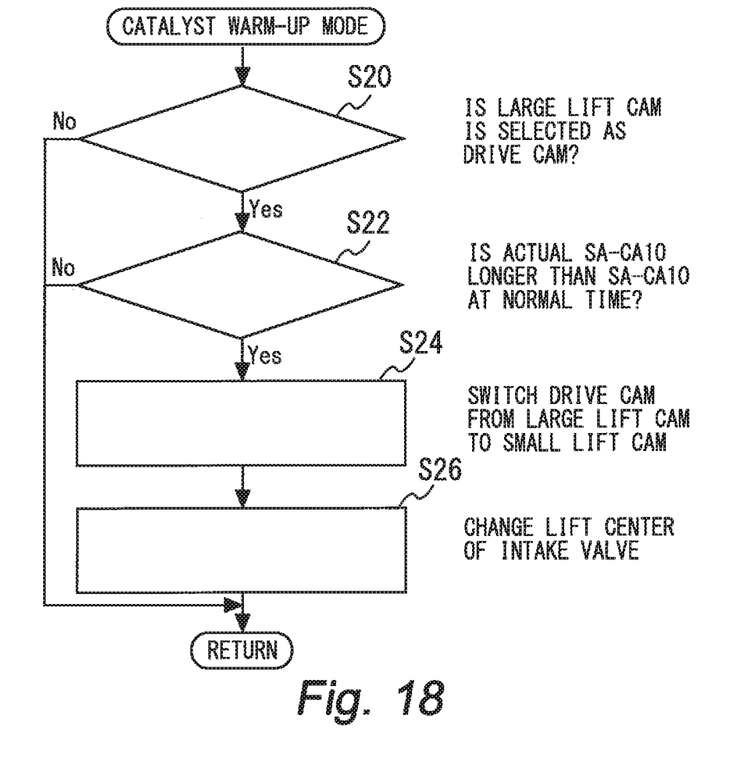
FIG. 18 is a flowchart for illustrating an example of processing that the ECU 40 executes in a third embodiment.

FIG. 18 a flowchart for illustrating an example of processing that the ECU 40 executes in the third embodiment. Note that the routine shown in FIG. 18 is repeatedly executed during a period in which the catalyst warm-up mode is selected.

In the routine illustrated in FIG. 18, first, a processing from the steps S20 to S24 is executed. The processing from the steps S20 to S24 is essentially the same as the processing from the steps S10 to S14 illustrated in FIG. 14.

Subsequent to the step S24, the lift center of the intake valve is changed (step S26). In the step S26, the lift center of the intake valve is changed so that the overlap period between the exhaust valve and the intake valve coincides with before and after the switching of the drive cam and also the close timing of the intake valve approaches to the bottom dead center side.

As described above, according to the routine illustrated in FIG. 18, when the drive cam is switched from the large cam to the small cam, it is possible to change the lift center of the intake valve so that the overlap period between the exhaust valve and the intake valve coincides with before and after the switching of the drive cam and also the close timing of the intake valve approaches to the bottom dead center side. Therefore, even when the initial combustion speed is slow due to the large lift cam as the drive cam, it is possible to suppress the increase in combustion fluctuation between cycles satisfactory.

Modification of Embodiment

In the first to the third embodiments, the engine configuration is adopted in which the tumble flow in the combustion chamber 20 swirls on the exhaust port 24 side so as to travel from the upper portion of the combustion chamber 20 toward the lower portion thereof, and swirls on the intake port 22 side so as to travel from the lower portion of the combustion chamber 20 toward the upper portion thereof. However, an engine configuration may be adopted in which the tumble flow swirls in the opposite direction. That is, the tumble flow may swirl from the upper portion toward the lower portion of the combustion chamber 20 on the intake port 22 side, and from the lower portion toward the upper portion of the combustion chamber 20 on the exhaust port 24 side. However, in this case, it is necessary to change the location at which the spark plug 32 is arranged from the exhaust valve 28 side to the intake valve 26 side. If the location at which the spark plug 32 is arranged is changed in this manner, the spark plug 32 will be positioned on the downstream side of the injector 30 in the flow direction of the tumble flow.

In the second and third embodiments, a determination with respect to the initial combustion speed is performed with the SA-CA10. However, instead of the SA-CA10, a determination with respect to the enlargement of the distance DT with a known parameter having a correlation with the rate of initial combustion. That is, as long as the parameter is a known parameter with respect to a determination value with which the initial combustion can be compared, the parameter can be used instead of the SA-CA10.

In the first to third embodiments, the fuel injection pattern is adopted in which twice injections in the intake stroke and the compression stroke injection are combined. However, a fuel injection pattern may be adopted in which a single injection in the intake stroke and the compression stroke injection are combined. Alternatively, a fuel injection pattern of only the expansion stroke injection without the intake stroke injection may be adopted.

In the first and second embodiments, two types of intake cams different in lift amount are switched. In the third embodiment, two types of intake cams different in lift amount and operation angle are switched. However, it is not necessary that a change in the lift amount or the operation angle is caused by switching between the two types of the intake cams. That is, the lift amount and the operation angle of the intake valve may be continuously changed by adjusting an attitude or a shape of a single intake cam.

What is claimed is:

1. A control device for controlling an internal combustion engine which is configured to control an engine,
    wherein the engine comprising:
    an injector which is provided in an upper portion of a combustion chamber and is configured to inject fuel into a cylinder directly;
    a spark plug which is configured to ignite an air-fuel mixture inside the cylinder by using a discharge spark generated at an electrode portion, the spark plug is provided at the upper portion of the combustion chamber and on a downstream side relative to the injector in a flow direction of a tumble flow which is formed inside the combustion chamber, the spark plug is provided so that a position of the electrode portion is above a contour surface of a fuel spray injected from the injector toward the spark plug;
    a lift amount variable mechanism which is configured to switch a lift amount of an intake cam which is provided in the combustion chamber to drive an intake valve at least between a small lift amount and a large small lift amount; and
    an exhaust gas cleaning catalyst that is configured to clean exhaust gas from the combustion chamber,
    wherein, in order to activate the exhaust gas cleaning catalyst, the control device is configured to:
    control the spark plug so as to generate a discharge spark at the electrode portion over a predetermined period on a retard side of compression top dead center;
    control the injector so as to perform an expansion stroke injection on the retard side of the compression top dead center, an injection period of the expansion stroke injection overlaps with at least a part of the predetermined period; and
    control the lift amount variable mechanism so that the lift amount of the intake cam is kept in the small lift amount.

2. The control device for an internal combustion engine according to claim 1,
    wherein, in order to activate the exhaust gas cleaning catalyst, the control device is further configured to:
    control the injector so as to perform an intake stroke injection in the same cycle in which the expansion stroke injection is performed; and
    control the lift amount variable mechanism so that the lift amount of the intake cam is changed when a growth rate of the initial flame is lower than a predetermined determination value, the initial flame is generated by a contact between a part of the fuel spray caused by the intake stroke injection and the discharge spark.

3. The control device for an internal combustion engine according to claim 2,
    wherein the lift amount variable mechanism is further configured to switch operation angle of the intake cam between a small operation angle and a large operation angle,
    wherein the engine further comprises a valve timing variable mechanism which is configured to change valve timing of the intake cam,
    wherein the control device is further configured to control the valve timing variable mechanism, when the growth rate of the initial flame is lower than the predetermined determination value, so that an opening period of the intake valve coincides with before and after the lift amount variable mechanism switches the operation angle and the lift amount of the intake cam and so that a closing period of the intake valve approaches to an intake bottom dead center.

4. The control device for an internal combustion engine according to claim 3,
    wherein the valve timing variable mechanism is further configured to change an overlap period in which an opening period of an exhaust valve provided in the combustion chamber overlaps with the opening period of the intake valve,
    wherein the control device is further configured to the valve timing variable mechanism so that the overlap period coincides with before and after the lift amount variable mechanism switches the operation angle and the lift amount of the intake cam.

* * * * *